(12) United States Patent
Calkins et al.

(10) Patent No.: US 7,353,839 B2
(45) Date of Patent: Apr. 8, 2008

(54) HIGH TEMPERATURE COMPLETION PLUG

(75) Inventors: Charles D. Calkins, Tulsa, OK (US); Jack E. Miller, Houston, TX (US)

(73) Assignee: TDW Delaware, Inc., Wilmington, DE (US)

( * ) Notice: Subject to any disclaimer, the term of this patent is extended or adjusted under 35 U.S.C. 154(b) by 408 days.

(21) Appl. No.: 11/132,773

(22) Filed: May 19, 2005

(65) Prior Publication Data

US 2006/0260685 A1 Nov. 23, 2006

(51) Int. Cl.
*F16K 27/00* (2006.01)
(52) U.S. Cl. .......................... 137/317; 138/89; 138/94; 220/315
(58) Field of Classification Search ................ 137/317, 137/318; 220/315, 780; 138/89, 94
See application file for complete search history.

(56) References Cited

U.S. PATENT DOCUMENTS

| | | | |
|---|---|---|---|
| 428,422 A | 5/1890 | Skinner | |
| 1,810,621 A | 6/1931 | Parks | |
| 2,085,119 A | 6/1937 | Penick et al. | |
| 2,134,311 A | 10/1938 | Minor et al. | |
| 2,771,096 A | 11/1956 | VerNooy | |
| 2,988,111 A | 6/1961 | VerNooy | |
| 3,074,591 A | 1/1963 | Raver | |
| 3,155,116 A | 11/1964 | VerNooy | |
| 3,289,765 A | 12/1966 | Hynes | |
| 3,405,763 A | 10/1968 | Pitts et al. | |
| 3,766,947 A | 10/1973 | Osburn | |
| 3,821,964 A * | 7/1974 | Bacon .......................... 137/317 |
| 4,058,142 A | 11/1977 | Rankin | |
| 4,144,909 A | 3/1979 | Harrison | |
| 4,326,587 A | 4/1982 | Gauthier et al. | |
| 4,387,740 A | 6/1983 | Vanzant | |
| 4,466,550 A | 8/1984 | Sullivan | |
| 4,576,778 A * | 3/1986 | Ferree et al. ................ 220/315 |
| 4,609,209 A | 9/1986 | Ralls | |
| 4,693,278 A | 9/1987 | Wilson et al. | |
| 4,749,047 A | 6/1988 | Taylor | |
| 4,886,121 A | 12/1989 | Demny et al. | |
| 5,038,818 A | 8/1991 | Jiles | |
| 5,114,158 A | 5/1992 | Le | |
| 5,209,521 A | 5/1993 | Osborne | |
| 5,327,965 A | 7/1994 | Stephen et al. | |
| 5,450,765 A | 9/1995 | Stover | |
| 5,456,320 A | 10/1995 | Baker | |
| 5,490,565 A | 2/1996 | Baker | |
| 5,531,250 A | 7/1996 | Freeman et al. | |
| 5,975,142 A | 11/1999 | Wilson | |
| 5,984,008 A | 11/1999 | Lang et al. | |
| 6,116,285 A | 9/2000 | Wilson | |
| 6,286,553 B1 | 9/2001 | Morgan | |

* cited by examiner

*Primary Examiner*—Kevin Lee
(74) *Attorney, Agent, or Firm*—Gable Gotwals

(57) ABSTRACT

For use in closing a cylindrical passageway through a working member in which the passageway is defined in part by a reduced diameter internal circumferential sealing surface and an internal locking groove, a completion plug having a plug body with a cylindrical external surface receivable within the cylindrical passageway of the working member and having an external circumferential sealing surface dimensioned to radially compressibly engage the working member internal circumferential sealing surface. The plug body has on its cylindrical surface an external locking groove. A locking ring is received in the working member internal locking groove and simultaneously in the plug body external locking groove and serves to lock the plug body within the working member.

14 Claims, 4 Drawing Sheets

HIGH TEMPERATURE COMPLETION PLUG

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

This invention relates to an irremovable, rotation-free installation, non-galling, metal-to-metal completion plug for closing a cylindrical passageway.

BACKGROUND OF THE INVENTION

It is frequently necessary to close an opening in a tubular member either temporarily, semi-permanently or, in the case of the present invention, permanently. That is, to close an opening when a valve is not required and is not desirable. One example of the utilization of a completion plug arises when a hot tap is made into a pipeline or vessel through a fitting connected to the pipeline or vessel. In the typical hot tapping application as utilized in the petroleum, chemical, refinery and other similar industries, a fitting, usually in the form of a flange, is welded on the exterior of a pipe that has flowing gas or liquid under pressure. A valve is then secured to the flange and a hot tapping machine is secured to the valve. By use of specialized equipment, a hole can then be drilled through the wall of the pipe while gas or liquid continues to flow through it. This provides access to the interior of the pipe, such as for inserting equipment to temporary block flow through the pipe while repairs are being made. After repairs are complete, the equipment is removed and the opening that provides communication to the interior of the pipe needs to be closed. In some instances, as above indicated, the closure is made in a way that at a future date access can again be obtained through the fitting to the interior of the pipe. In the present case a completion plug is provided that permanently closes the opening. In addition, most known completion plugs make use of elastomers, such as rubber or plastics, to achieve leak proof sealing. The present invention, in contrast, provides heat resisting, metal-to-metal sealing.

For background information relating to completion plugs, reference may be had to the following previously issued United States patents.

| Patent Number | Inventor | Title |
| --- | --- | --- |
| 428,422 | Skinner | Casing Head |
| 1,810,621 | Parks | Valve Mechanism |
| 2,085,119 | Penick et al. | Seal Off Tool |
| 2,134,311 | Minor et al. | Method and Apparatus For Suspending and Sealing Well Casings |
| 2,771,096 | Ver Nooy | Fluid Tight Closure |
| 2,988,111 | Ver Nooy | Fluid Tight Closure |
| 3,074,591 | Raver | Pressure Closure |
| 3,155,116 | Ver Nooy | Apparatus For Closing Side Openings Into Pipelines |
| 3,289,765 | Hynes | Method and Apparatus For Completing Wells |
| 3,405,763 | Pitts et al. | Well Completion Apparatus and Method |
| 3,766,947 | Osburn | Fluid Tight Closure |
| 4,058,142 | Rankin | Pipeline Fitting |
| 4,144,909 | Harrison | Apparatus For Closing Side Openings Into Pipelines |
| 4,326,587 | Gauthier et al. | Casing Hanger and Stabilizer Apparatus and Method |
| 4,387,740 | Vanzant | Cam-Flange |
| 4,466,550 | Sullivan | Closure For A Cylindrical Opening Having Improved Venting Means |
| 4,609,209 | Ralls | Precise Alignment Adapter Flange |
| 4,693,278 | Wilson et al. | Safety Closure Member |
| 4,749,047 | Taylor | Annular Wellhead Seal |
| 4,886,121 | Demny et al. | Universal Flexbowl Wellhead and Well Completion Method |
| 5,114,158 | Le | Packing Assembly For Oilfield Equipment and Method |
| 5,209,521 | Osborne | Expanding Load Shoulder |
| 5,327,965 | Stephan et al. | Wellhead Completion System |
| 5,450,765 | Stover | Apparatus For Providing Signal Communication Between The Interior and Exterior Of A Pipeline |
| 5,456,320 | Baker | Casing Seal and Spool For Use In Fracturing Wells |
| 5,490,565 | Baker | Casing Seal and Spool For Use In Fracturing Wells |
| 5,975,142 | Wilson | Removable Closure System |
| 5,984,008 | Lang et al. | Installable Load Shoulder For Use In A Wellhead To Support A Tubing Hanger |
| 6,116,285 | Wilson | Removable Threaded Plug |
| 6,286,553 | Morgan | Removable Closure System |

BRIEF SUMMARY OF THE INVENTION

This invention provides a closure member that is commonly referred to as a completion plug. A completion plug of the type characterized by the present invention provides means for closing a cylindrical opening or passageway. In a typical application of the invention, the completion plug is used to close the passageway through a flange member, that is, a tubular member that has an integral, radially extending flange portion that is readily adaptable for the attachment of other structural or piping devices. A flange member as used in the present invention has an inner end and an outer end with a passageway defined by a cylindrical surface having a first internal diameter adjacent the inner end, an intermediate cylindrical surface of slightly increased diameter and a third cylindrical surface of increased internal diameter, the third cylindrical surface communicating with the flange outer end. Formed in the third cylindrical surface that is contiguous with, or at least adjacent, the flange outer end is an increased internal diameter circumferential groove.

The completion plug of this invention is formed of three basic elements, that is, a plug body, a completion tool that is used in the installation of the plug body and an insertion member that is separately manufactured but is permanently secured to the completion tool. The plug body is a cylindrical member having an inner end and an outer end. On the cylindrical surface of the plug body adjacent the inner end is a sealing surface. In the preferred and illustrated arrangement the sealing surface includes circumferential beads of slightly increased external diameter. These circumferential beads contact the interior cylindrical intermediate surface of the flange when the completion plug is installed in position within the flange.

Formed on the external cylindrical surface of the plug body adjacent the outer end is a circumferential slot that receives therein a lock ring. The lock ring is manufactured such as to have a slight radial expansion characteristic so that it must be externally compressed to be confined within the external circumferential slot of the plug body.

The plug body is further defined by a concentric, integral, short-length central post that has a circumferential recess on its external surface.

The plug body is carried into position within the cylindrical opening in the flange fitting by means of the completion tool that includes an inner tubular portion of internal diameter dimensioned to receive the central post of the plug body. Further the completion tool includes an outer circumferential lip portion that has an internal diameter slightly greater than the external diameter of the plug body at the plug body outer end.

A tubular insertion member is received within the tubular opening of the completion tool and is telescopically secured to the completion tool. The insertion member has an internal surface adjacent the outer end thereof that slidably receives the plug central post. Retention balls are retained by the insertion tool that extend inwardly into the circumferential recess in the central post of the plug body so that the insertion tool and thereby the completion tool itself are removably secured to the plug body.

The completion tool is telescopically secured to the insertion member for use in inserting the plug body into the cylindrical passageway of a flange fitting. When secured to the plug body the completion tool lip portion surrounds the lock ring that is compressed within the plug body outer circumferential slot.

The completion plug is installed by moving the assembly of the completion plug, completion tool and insertion member into the flange fitting passageway. The insertion tool circumferential lip portion engages the upper end of the flange fitting, limiting further downward movement of the insertion tool relative to the flange fitting. However, additional downward force on the insertion member pushes the plug body downwardly past the completion tool lip portion. This allows the lock ring to expand outwardly and into the internal circumferential groove formed in the flange fitting. With the lock ring partially within the inner circumferential groove of the flange fitting and partially within the outer circumferential slot of the plug body, the plug body is locked in position within the flange fitting. The plug body circumferential sealing surface is then in metal-to-metal contact with the intermediate cylindrical surface of the flange fitting passageway providing a leak proof, heat resistant metal-to-metal seal thereby closing fluid flow through the flange fitting passageway.

After the plug body has been pushed into position so that the lock ring expands outwardly into the circumferential groove of the flange fitting, the direction of force applied to the insertion member is reversed so the insertion member is moved upwardly with respect to the plug body which is now locked into position within the flange fitting. Upward displacement of the insertion member carries with it the completion tool so that only the plug body remains within the flange fitting passageway. Thereafter, as a safety measure, a blind flange can be secured to the flange fitting upper end.

The completion plug disclosed herein is referred to as a "High Temperature" Completion Plug. This title has been selected since it alludes to an important characteristic of the plug, that is, its metal-to-metal seal that does not rely on elastomeric materials. The absence of elastomers makes the completion plug particularly useful for high temperature applications but it is by no means limited to such applications and can be used to close flow irrespective of the temperature of the fluid.

A better understanding of the invention will be obtained from the following detailed description of the preferred embodiments and claims, taken in conjunction with the attached drawings.

DETAILED DESCRIPTION OF THE PREFERRED EMBODIMENTS

Figure 1:
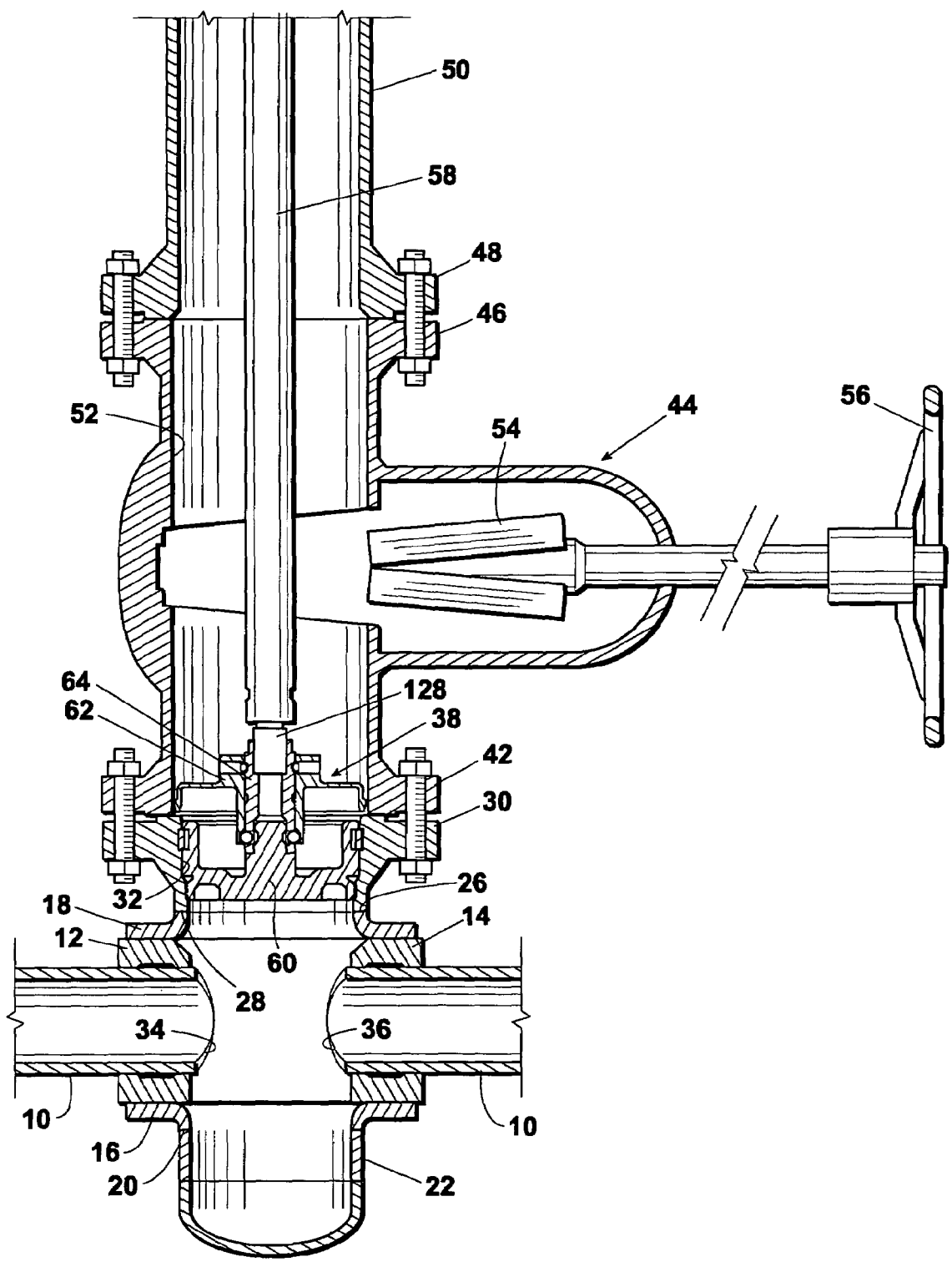
FIG. 1 is an elevational cross-sectional view of an assembly for use in plugging a pipe. The assembly includes a flange fitting having a cylindrical passageway therethrough. Affixed to the flange fitting is the lower portion of apparatus by which the pipe has been accessed for performing a plugging operation. An extendable shaft has affixed to a lower end thereof a high temperature completion plug assembly that is used to close the passageway through the flange fitting. The present invention concerns this high temperature completion plug assembly.

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements illustrated in the drawings are identified by the following numbers:
10 Pipe
12 Collar
14 Collar
16
18 Upper containment portion
20 Bottom opening
22 Tubular extension
24 Closure head
26 Cylindrical opening
28 Bottom cylindrical opening
30 Flange fitting
32 Passageway through flange 30
34 Exposed end of pipe 10
36 Exposed end of pipe 10

38 Completion plug assembly
40 Top surface of flange 30
42 Valve bottom flange
44 Valve
46 Top valve flange
48 Bottom flange
50 Hydraulic cylinder
52 Vertical passageway
54 Valve closure member
56 Hand wheel
58 Piston rod
60 Plug body
62 Completion plug
64 Insertion member
66 Lower end
68 Upper end
70 Cylindrical surface
72 Central post portion
74 Annular recess
76 Groove
78 External circumferential sealing surface
80 Circumferential bead surfaces
82 Annular recess
84 Base portion of the central post
86 Top portion of the central post
88 Circumferential groove
90 Tubular portion
92 Internal diameter
94 Cap portion
96 Bonnet portion
98 Lower circumferential edge
100 Upper part of tubular portion 90
102 Threaded openings
104 Spring plungers
106 Inner end
108 External surface
110 First circumferential notch
112 Second circumferential notch
114 Internal threads
116 Internal diameter
118 Radial openings
120 Sphere
122 Lock ring
124 Internal circumferential sealing surface
126 Internal groove in flange 30
128 External threads
130 Increased internal diameter portion of 90

Before describing the details of the completion plug assembly of this invention, a typical environment in which a completion plug is used will be explained making reference to FIG. 1. This figure shows a pipe or pipeline 10 and affixed to it portions of a closure system by which flow through the pipe can be terminated temporarily for purposes of repair or maintenance. Welded to the exterior of pipe 10 are collars 12 and 14. After the collars are welded in position around the pipe, a containment housing is formed by welding to the collars a lower containment portion 16 and an upper containment portion 18. The lower containment portion 16 has a bottom opening 20 that receives a tubular extension 22 which in turn receives a closure head 24. Upper containment portion 18 has an upper cylindrical opening 26 that has welded to it the bottom cylindrical opening 28 of a flange fitting 30.

All of the elements enumerated to this point are welded to each other to form a containment housing surrounding a length of pipe 10. Flange fitting 30 has a passageway 32 through which tools may be moved for operating on the portion of pipe 10 within the containment housing. By means of a circular saw (not shown), a length of the pipe 10 is cut and removed leaving exposed pipe ends 34 and 36. Apparatus (not shown) can now be inserted through the passageway 32 in flange fitting 30 to cap off the ends 34 and 36 of pipe 10 and thereby close fluid flow. After repair or maintenance has been done, the mechanism for capping off the ends of the pipe are removed and it then becomes necessary to provide a permanent closure of the containment housing. Specifically, to complete the job of temporarily terminating fluid flow through pipe 10, the passageway 32 in flange fitting 30 must be closed. The invention herein provides a system of achieving permanent, high temperature closure of passageway 32 by means of a completion plug assembly generally indicated by the numeral 38.

Before describing the details of completion plug assembly 38 and flange fitting 30, further reference to FIG. 1 shows systems by which completion plug assembly 38 can be installed into flange fitting 30. Secured to the top surface 40 of flange fitting 30 is a valve bottom flange 42 which is a lower portion of a valve generally indicated by the numeral 44. Valve 44 has a top flange 46 which receives the bottom flange 48 of a hydraulic cylinder 50. Valve 44 has a vertical passageway 52 therethrough that is of internal diameter equal to or greater than the passageway 32 in flange 30. Opening 52 in valve 44 may be closed by a valve closure member 54 that is moved into and out of closed position by a hand wheel 56. Valve 44 makes it possible to move tools into and out of the containment housing that has been formed around pipe 10 to perform operations such as to sever the pipe to leave exposed ends 34 and 36 and to insert into the containment housing equipment (not shown) by which the flow through pipe 10 is completely closed. As previously stated, after all operations necessary within the containment housing have been completed it is then necessary to close passageway 32 in flange fitting 30 and this is the function of the completion plug assembly 38.

There is shown, extending from cylinder 50, a piston rod 58 which is attached to a piston (not shown) by which completion plug assembly 38 is moved into position to close passageway 32 through flange fitting 30.

Figure 2:
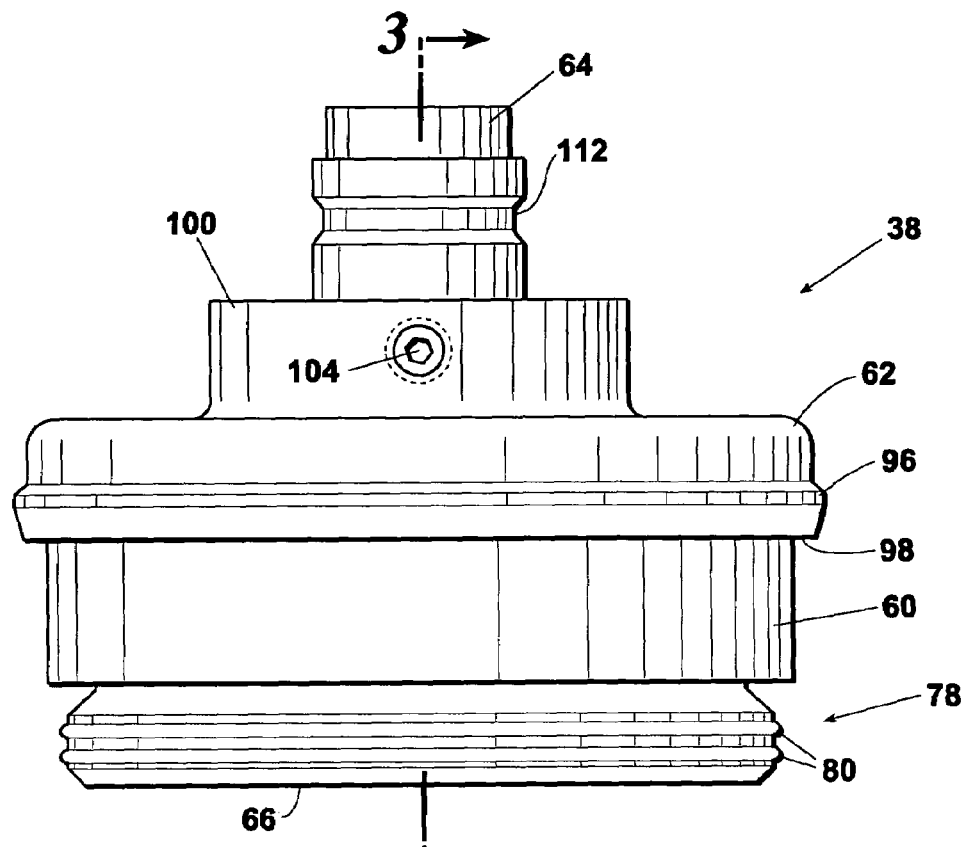
FIG. 2 is an external view of a completion plug assembly that incorporates the principles of this invention.
Figure 3:
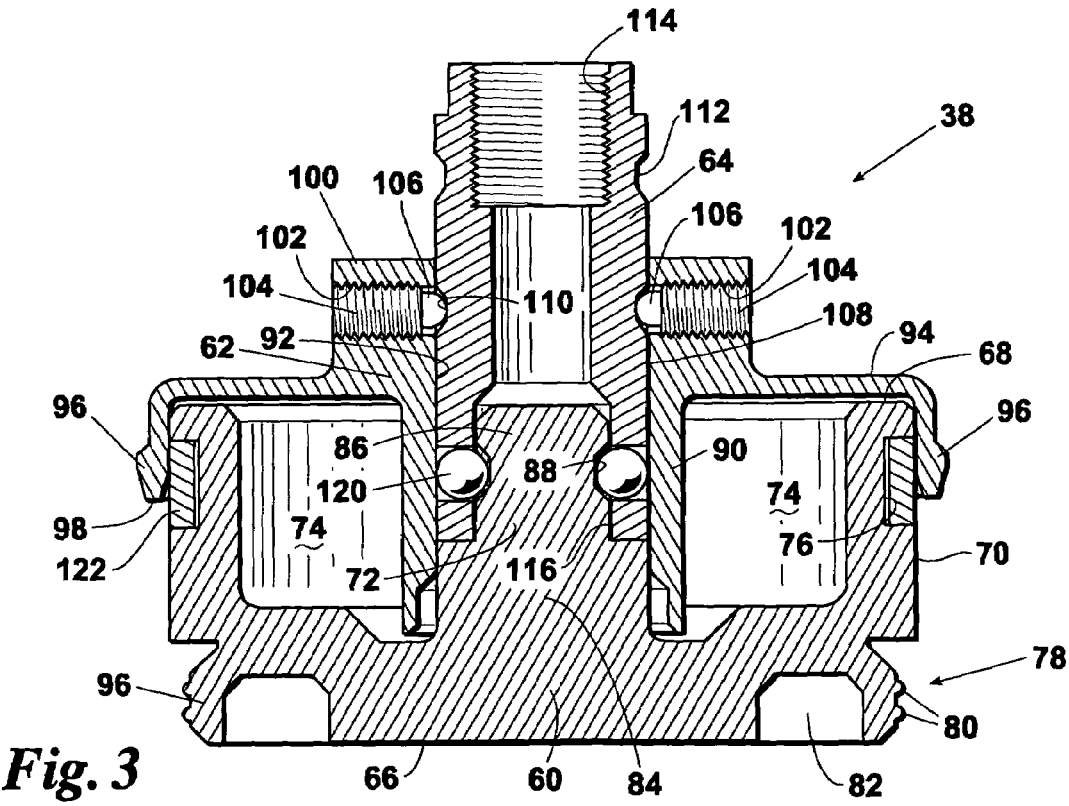
FIG. 3 is a cross-sectional view of the completion plug assembly as taken along the line 3-3 of FIG. 2.

The completion plug assembly which is the essence of this invention will now be described with reference to FIGS. 2 through 5. FIG. 2 is an external view of the completion plug assembly 38 while FIG. 3 is a cross-sectional view. The completion plug assembly consists essentially of three basic metal components. These are, a plug body 60, a completion plug 62 and an insertion member 64. Plug body 60 has a lower end 66 and an upper end 68. The plug body has a cylindrical external surface 70 and further includes an integral, upstanding central post portion 72 leaving an annular recess 74. Formed in the external cylindrical surface 70 of the plug body is a circumferential external groove 76.

Integrally formed as a lower portion of plug body 60 is a external circumferential sealing surface generally indicated by the numeral 78. Sealing surface 78 is preferably surface hardened to reduce galling. In the illustrated and preferred embodiment of circumferential sealing surface 78 a plurality of circumferential radially extending bead surfaces 80 are formed. In the illustrated embodiment there are two spaced apart circumferential bead surfaces 80, however, only a single circumferential bead surface may be used or a plurality of two or more may be employed. Two spaced apart circumferential beads 80 as illustrated are considered an optimal sealing surface for the completion plug.

There is formed in the lower end 66 of plug member 60 an annular recess 82 that provides a slight degree of compressive flexibility to the circumferential sealing surface 78. This configuration provides a compressive metal-to-metal seal of the plug as it is contained within flange fitting 30.

The central post 72 of plug body 60 has a lower, larger diameter, base portion 84, and an upper reduced external diameter top portion 86. Formed on the central post top portion 86 is a circumferential groove 88.

Positioned on plug body 60 is the completion plug 62 which has an internal tubular portion 90 having an internal diameter 92 that telescopically extends over plug body central post base portion 84. A radially extending cap portion 94 has a downwardly extending bonnet portion 96 that terminates with a lower circumferential edge 98. The upper part 100 of tubular portion 90 is of increased thickness and has opposed threaded openings 102, each of which receives a spring plunger 104 having an inner end 106.

Insertion member 64 is tubular with a cylindrical surface 108 that has a first circumferential notch 110 and a second circumferential notch 112. The upper interior end of the insertion member has internal threads 114.

The lower portion of the tubular insertion member 64 is of internal diameter 116 to telescopically fit over the top portion 86 of central post 72 of plug body 60. Radial opening 118 extends through the wall of the lower tubular portion of the insertion member and receives spheres 120 that are of a diameter greater than the thickness of the tubular wall of the lower portion of the insertion tool so that the spheres extend within circumferential groove 88 formed in the top portion 86 of the plug body.

Received within circumferential groove 76 formed in the exterior surface 70 of plug body 60 is a split lock ring 122 that is formed so that it has a normal exterior diameter greater than the external diameter in the groove in which it rests as seen in FIG. 3. Therefore, the lock ring 122 is in a compressed state as seen in FIG. 3 and held in such compressed state within groove 76 by the lip portion 96 of the completion tool.

Figure 6:
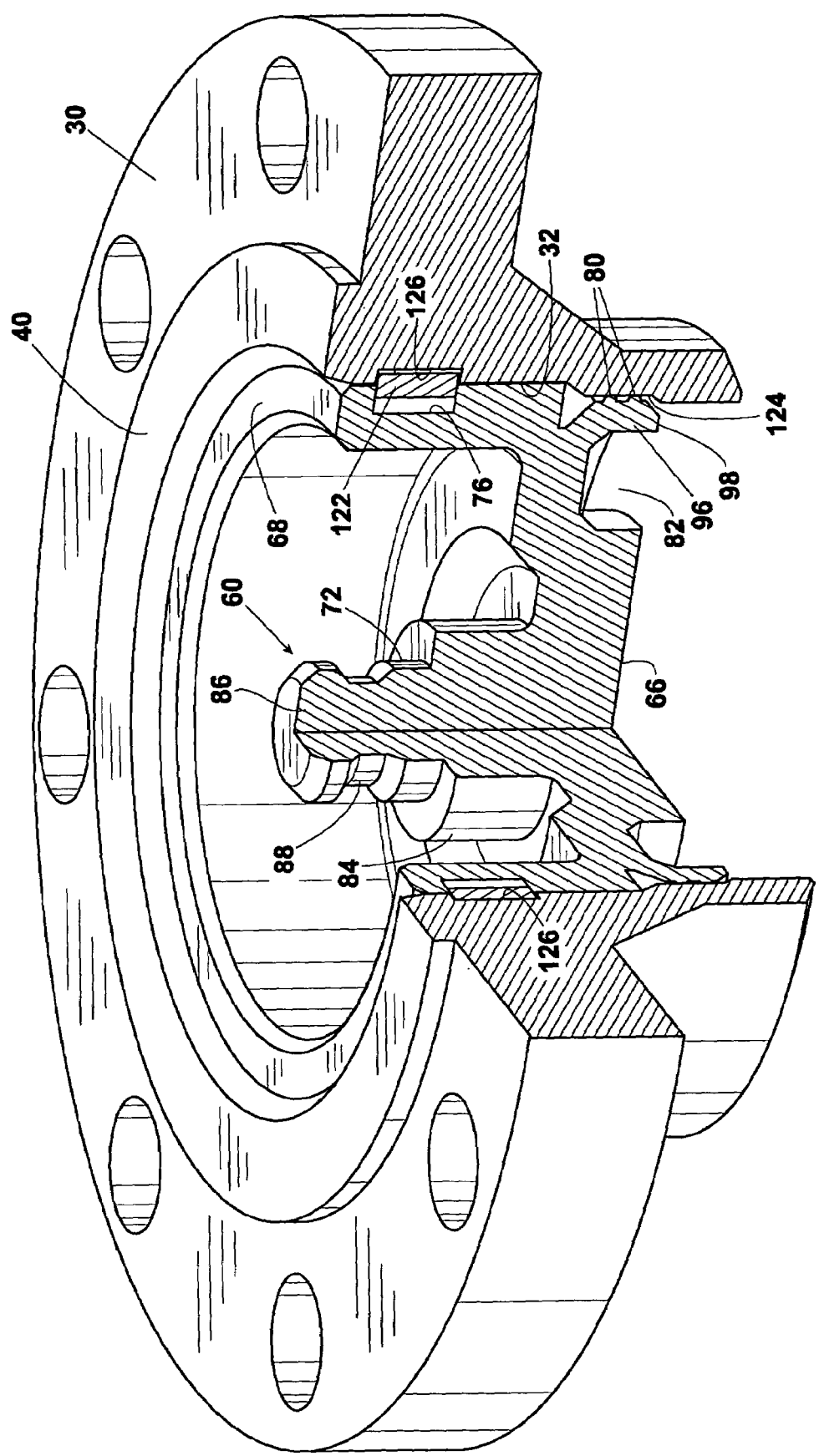
FIG. 6 illustrates a flange fitting, shown cutaway, with a completion plug of this invention installed within the cylindrical passageway to thereby sealably close the passageway in a metal-to-metal relationship. Such metal-to-metal relationship provides a high temperature closure of the flange fitting by eliminating the use of elastomeric or other nonmetallic sealing elements that can fail in case of a fire or when high temperatures are otherwise encountered.

Reference will now be made to FIG. 6 which illustrates a cross-sectional perspective view of flange fitting 30 with plug body 60 installed therein. Flange fitting 30 has, as previously described, a passageway 32 therethrough. A lower portion of passageway 32 forms a circumferential sealing surface 124 and is of reduced internal diameter relative to the base passageway 32 in flange 30. In addition, within flange passageway 32 is an increased diameter groove 126 that is dimensionally configured substantially like the external circumferential groove 76 in plug body 60.

Figure 4:
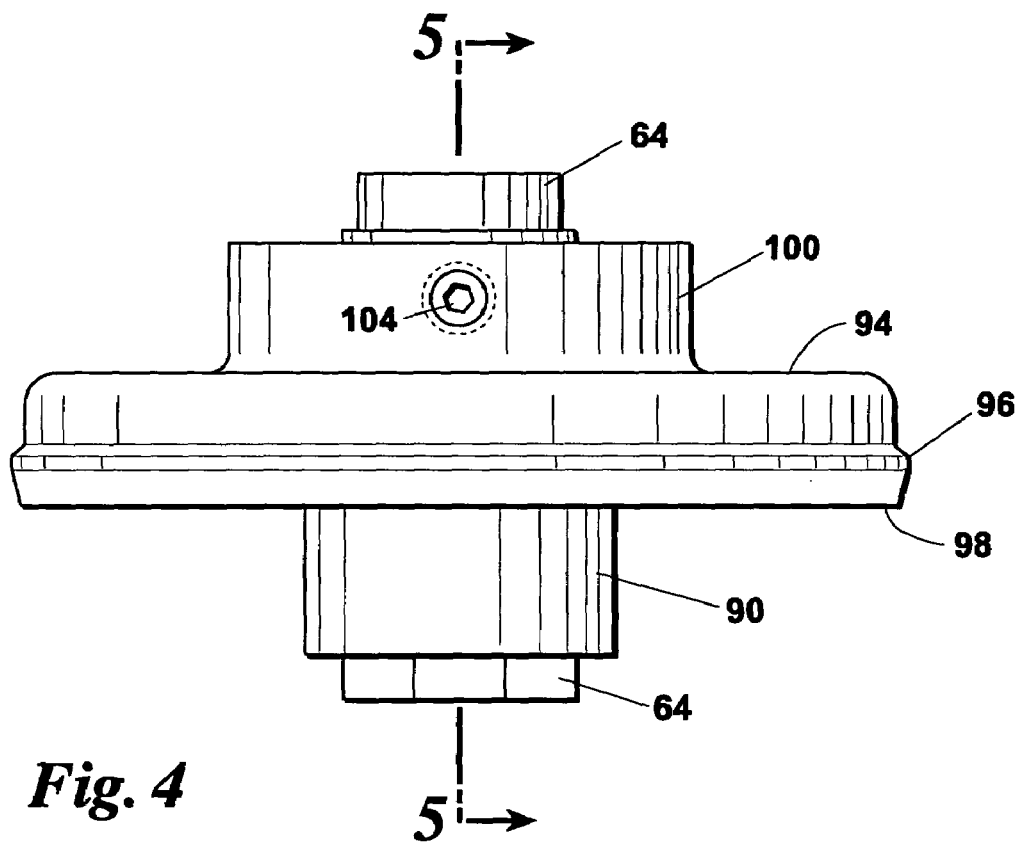
FIG. 4 is an external view of the completion tool and insertion member that are used for installation of the completion plug within a cylindrical opening, such as the passageway of a flange fitting as shown in FIG. 1.
Figure 5:
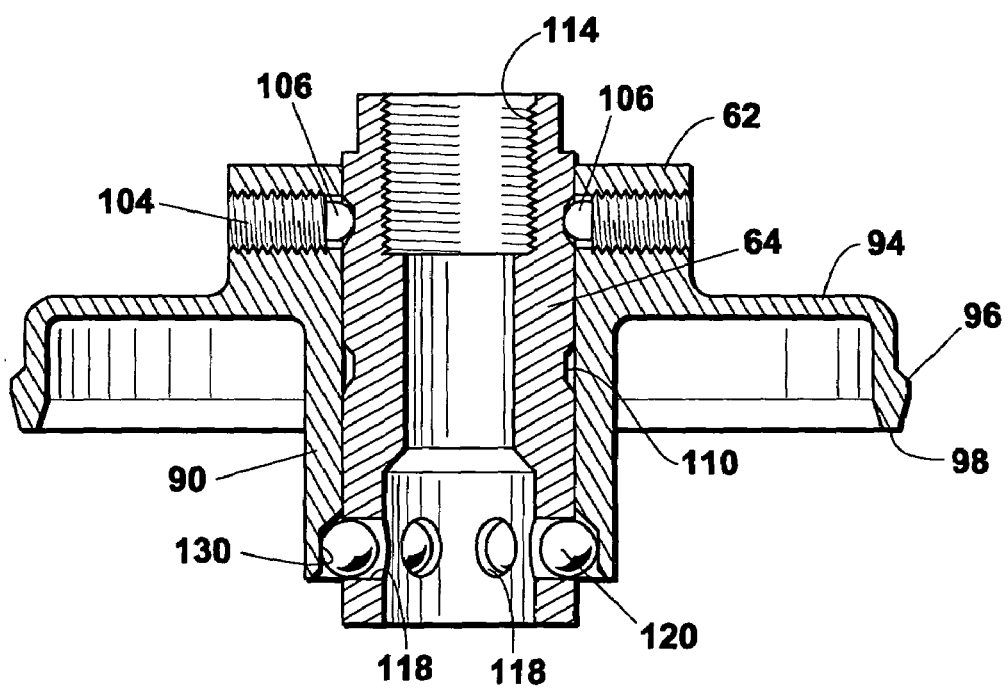
FIG. 5 is a cross-sectional view of the completion plug installation tool and insertion member of FIG. 4, taken along the line 5-5 of FIG. 4.

The method of installation of plug body 60 into flange fitting 30 to assume the position and condition as shown in FIG. 6 will now be described. As seen in FIG. 1, piston rod 58 is employed to insert plug body 60 into flange fitting 30, then remove completion plug 62 and insertion member 64 after the plug body installation is achieved. The lower end of piston rod 58 is externally threaded at 128 and threadably engages the internal threads 114 at the top end of insertion member 64 to interconnect piston rod 58 and completion plug assembly 38. As the assembly is forced downwardly into flange fitting 30, the lower end of the plug body enters into passageway 32. The assembly continues to move downward until the lower circumferential edge 98 of completion plug 62 engages the top surface 40 of flange fitting 30. The external diameter of bonnet portion 96 is greater than the internal diameter of passageway 32 in the flange and therefore further downward movement of completion plug 62 is terminated. However, with increased downward force of piston rod 58, insertion member 64 carrying with it plug body 60 continues to move downward. This is achieved by application of sufficient force such that the inner ends 106 of spring plungers 104 are retracted sufficiently to permit insertion member 64 to pass downwardly past spring plungers 104. As this action takes place the plug body is forced downwardly with respect to completion plug 62 so that the lock ring 122 passes beyond the lower end of the lower circumferential edge 98 of bonnet portion 96 of the insertion tool. This allows lock ring 122 to expand radially outwardly and into groove 126 in flange member 30. The depth of groove 126 is less than the thickness of lock ring 122 so the lock ring extends partially into groove 126 in flange fitting 30 and partially within groove 76 in plug body 60. When lock ring 122 has been installed as shown in FIG. 6, the completion plug 62 and insertion member 64 are in the position with respect to each other as seen in FIGS. 4 and 5. In this position spheres 120 are permitted to radially expand outward by an increased internal diameter portion 130 of the completion tool tubular portion 90. When this occurs, the insertion tool 64 and completion plug 62 are free to be extracted upwardly from plug body 60. FIG. 1 shows the condition in which the plug body 60 has been installed within the passageway through the flange fitting 30 and the completion plug 62 and insertion member 64 can freely be removed upwardly to pass through valve 44. Thereafter bolts holding lower flange 42 of valve 44 to flange fitting 30 may be removed. The opening through flange fitting 30 is sealed in a metal-to-metal heat resisting fashion. Typically a blind flange or other closure member (not shown) is bolted to the top surface 40 of flange fitting 30 as a safety precaution. Thus, the plug body has been inserted into the flange fitting 30 with the circumferential sealing surface 78 as characterized by circumferential beads 80 in metal-to-metal sealing contact with the internal circumferential sealing surface 124 of flange fitting 30.

The completion plug as has been described has three important features. First, as stated above, the completion plug attains metal-to-metal closure of the passageway through the flange fitting. Second, the sealing surface 78 of plug body 60 is surface hardened to reduce galling. Third, the assembly of the plug body into the flange fitting does not require any rotation, that is, no part of the sealing operation requires a threading or other rotational action.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use in closing a cylindrical passageway through a working member in which the passageway is defined in part by a reduced diameter internal circumferential sealing surface and an internal locking groove, a completion plug, comprising:

a plug body having a cylindrical external surface receivable within the cylindrical passageway of the working member and having an annular recess in said plug body thereby forming a reduced thickness circumferential lip on which is provided an external circumferential sealing surface, the circumferential lip having inward radial compressibility and being dimensioned to radially compressibly engage the working member internal circumferential sealing surface and having on said cylindrical external surface a circumferential locking groove; and a locking ring receivable in the working member internal locking groove and simultaneously in said plug body external circumferential locking groove for thereby locking said plug body within the working member.

2. A completion plug according to claim 1 wherein said plug body external circumferential sealing surface has thereon at least one radially extending, integral, circumferential bead.

3. A completion plug according to claim 1 including an annular recess in said plug body radially inwardly of said external circumferential sealing surface thereby forming a reduced thickness circumferential lip on which said external circumferential surface is formed thereby providing increased inward radial compressibility of said plug body sealing surface.

4. A completion plug according to claim 1 wherein said plug body includes an integral, axial central post portion by which said plug body is insertable into the cylindrical passageway of a working member.

5. For use in closing a cylindrical passageway through a working member in which the passageway is defined in part by a reduced diameter internal circumferential sealing surface and an internal locking groove, a completion plug system, comprising:

a plug body having a cylindrical external surface receivable within the cylindrical passageway of the working member and having an external circumferential sealing surface dimensioned to radially compressibly engage the working member internal circumferential sealing surface and having on said cylindrical surface an external locking groove;

a locking ring received in said plug body external locking groove; and a completion tool of exterior dimensions greater than the cylindrical passageway in the working member and enveloping an upper portion of said plug body for retaining said locking ring in said locking groove, said plug body being axially displaceable by downward force causing said locking ring to pass from envelopment by the completion tool and to enter into the working member internal locking groove.

6. A completion plug system according to claim 5 wherein said plug body external sealing surface has thereon at least one radially extending, integral, circumferential bead.

7. A completion plug system according to claim 5 including an annular recess in said plug body radially inwardly of said external circumferential sealing surface thereby forming a reduced thickness circumferential lip on which said external circumferential surface is formed thereby providing increased inward radial compressibility of said plug body sealing surface.

8. A completion plug system according to claim 5 wherein said plug body includes an integral, axial central post portion by which said plug body is insertable into the cylindrical passageway of a working member.

9. A completion plug system according to claim 8 wherein said completion tool releasably telescopically envelops said central post.

10. A completion plug system according to claim 8 including:

a tubular insertion member telescopically and releasably positioned on said central post portion of said plug body and having means at an upper end for receiving a piston rod by which said plug body is axially positionable, said completion tool being axially and detachably positioned on said insertion tool, downward force on the insertion member servicing to downwardly displace said plug body to release said lock ring into the working member internal locking groove.

11. For use in closing a cylindrical passageway through a working member in which the passageway is defined in part by a reduced diameter internal circumferential sealing surface and an internal locking groove, a completion plug assembly, comprising:

a plug body having a cylindrical external surface receivable within the cylindrical passageway of the working member and having an external circumferential sealing surface dimensioned to radially compressibly engage the working member internal circumferential sealing surface and having on said cylindrical surface an external locking groove and having an integral, axial central post portion;

a locking ring received in said plug body external locking groove;

a tubular insertion member telescopically and releasably secured to said plug member central post portion; and a completion tool of external diameter greater than the cylindrical passageway in the working member and enveloping and releasably secured to said insertion tool, and having a skirt portion for retaining said locking ring within said plug body exterior locking ring groove, said insertion member and thereby said completion tool being downwardly displaceable to force said plug body into the working member passageway whereby said locking ring is released to expand into said internal locking groove, said insertion member and said completion tool being thereafter extractable from said plug body.

12. A completion plug assembly according to claim 11 wherein said plug body external sealing surface has thereon at least one radially extending, integral, circumferential bead.

13. A completion plug assembly according to claim 11 including an annular recess in said plug body radially inwardly of said external circumferential sealing surface thereby forming a reduced thickness circumferential lip on which said external circumferential surface is formed thereby providing increased inward radial compressibility of said plug body sealing surface.

14. A completion plug assembly according to claim 11 wherein said insertion member has means at an upper end for receiving a piston rod by which said plug body is axially positionable within the working member passageway.

* * * * *